United States Patent [19]

Suter

[11] 4,074,834
[45] Feb. 21, 1978

[54] CASTING HEAD WITH TOGGLE LEVER ACTUATED VALVE

[76] Inventor: Alois Joseph Suter, Im Holeeletten 29, Basel, Switzerland

[21] Appl. No.: 727,847

[22] Filed: Sept. 29, 1976

[30] Foreign Application Priority Data

Sept. 29, 1975 Switzerland .................. 12579/75

[51] Int. Cl.² ............................................. B29F 1/03
[52] U.S. Cl. ................................ 222/504; 222/509; 222/518; 251/63.4; 425/564
[58] Field of Search ............... 251/63.4, 229; 222/477, 222/504, 509, 518, 559; 425/245 R

[56] References Cited

U.S. PATENT DOCUMENTS

| 2,083,734 | 6/1937 | Noble | 251/63.4 X |
| 3,097,396 | 7/1963 | Ludwig | 425/245 |
| 3,912,133 | 10/1975 | Hehl | 222/518 X |

Primary Examiner—Robert B. Reeves
Assistant Examiner—David A. Scherbel
Attorney, Agent, or Firm—Tab T. Thein

[57] ABSTRACT

A casting head for cooperation with a mold in which hardenable synthetic resins can be cast under a high temperature, comprising: a stationary and a respectively movable head part; at least one hydraulic cylinder in the stationary head part to change the relative position of a portion of the movable part, between a closed rest position and a casting position, in which latter a passage of the casting head is open to feed the resin to an inlet opening of the mold; the movable head part includes a housing with bottom and top parts; at least one toggle lever is slidably journaled and pivotable in the bottom housing part while the movable head part has therein a lengthwise movable closure rod, the outer end of the latter carrying a closure head which acts on the passage to open and close the same; and spring means for closing the passage when the pressure applied to the cylinder has been released, the spring means being compressed by way of the closure rod and the closure head when the passage is being opened. Among other optional features, a removable casting nozzle is suggested which has a low heat conductivity.

9 Claims, 4 Drawing Figures

CASTING HEAD WITH TOGGLE LEVER ACTUATED VALVE

The invention relates to a casting head for arrangements that process thermo-hardening synthetic resins under high temperatures.

It is known to introduce liquid synthetic-resin masses that are at room temperature, and which harden on the effect of high temperatures, into appropriately shaped molds by using gravitational feed or by applying pressure, the molds being heated to the required hardening temperatures; for shrinkage compensation, additional amounts of the resin mass are being fed during the hardening period.

The mass was fed so far to the mold by way of any optional conduit, e.g. a pipe or hose, which could be opened and closed by the intermediary of a frictional valve or by squeezing clamps. A flange connection or so-called quick coupling was generally used for linking the pipe or hose to the inlet opening of the mold.

Such somewhat make-shift expedients should be replaced in a rational and efficient operation of casting arrangements by devices that satisfy certain important requirements that relate to the casting process proper.

It should be considered that the additional synthetic-resin mass that has to be fed during the shrinkage period also has to be administered under pressure so that a tight connection is mandatory between the feed conduit or the casting head and the mold itself. It has to be observed that the resin should not harden before it is properly and fully applied to the suitably heated mold, requiring that a possibly small heat transfer remain between the heated mold and the casting head.

It is therefore one of the objects of this invention to provide a casting head for processing synthetic resins that harden on the effect of high temperatures, wherein the time required for attachment to and detachment from the mold is minimal. It is also mandatory that the parts of the casting head that touch the mold during the hardening of the resin mass have a material of low heat conductivity so that only minimum amounts of heat are absorbed thereby.

The invention relates to a casting head for processing thermo-hardening synthetic resins, for cooperation with a casting arrangement, the head consisting of stationary and movable parts, the latter being shiftable with respect to the former by means of a hydraulic cylinder between casting and closing positions, the casting position corresponding to a contact of the forwardly end of the movable part with a resin outlet opening against an inlet of the mold during casting. There is a closure rod journaled in the movable part with a closure head for acting on an opening passage that leads to the outlet opening, the rod being movable by means of at least one toggle lever, controlled by the cylinder which has a piston rod for operating the closure rod.

According to novel and inventive features, a compressible spring package is used for closing the passage, when the pressure in the cylinder that was used for the opening thereof has been released, the spring package being compressed and pre-tensioned by way of the closure rod and the closure head.

Other objects, features and advantages of the invention will be explained hereunder in full detail.

The invention will be better understood by way of the following detailed description, when considered in conjunction with the accompanying drawings, wherein FIG. 1a is a partial longitudinal section through the left-hand part of an exemplary casting head according to the present invention, movable parts thereof being shown in closed positions;

Figure 1:
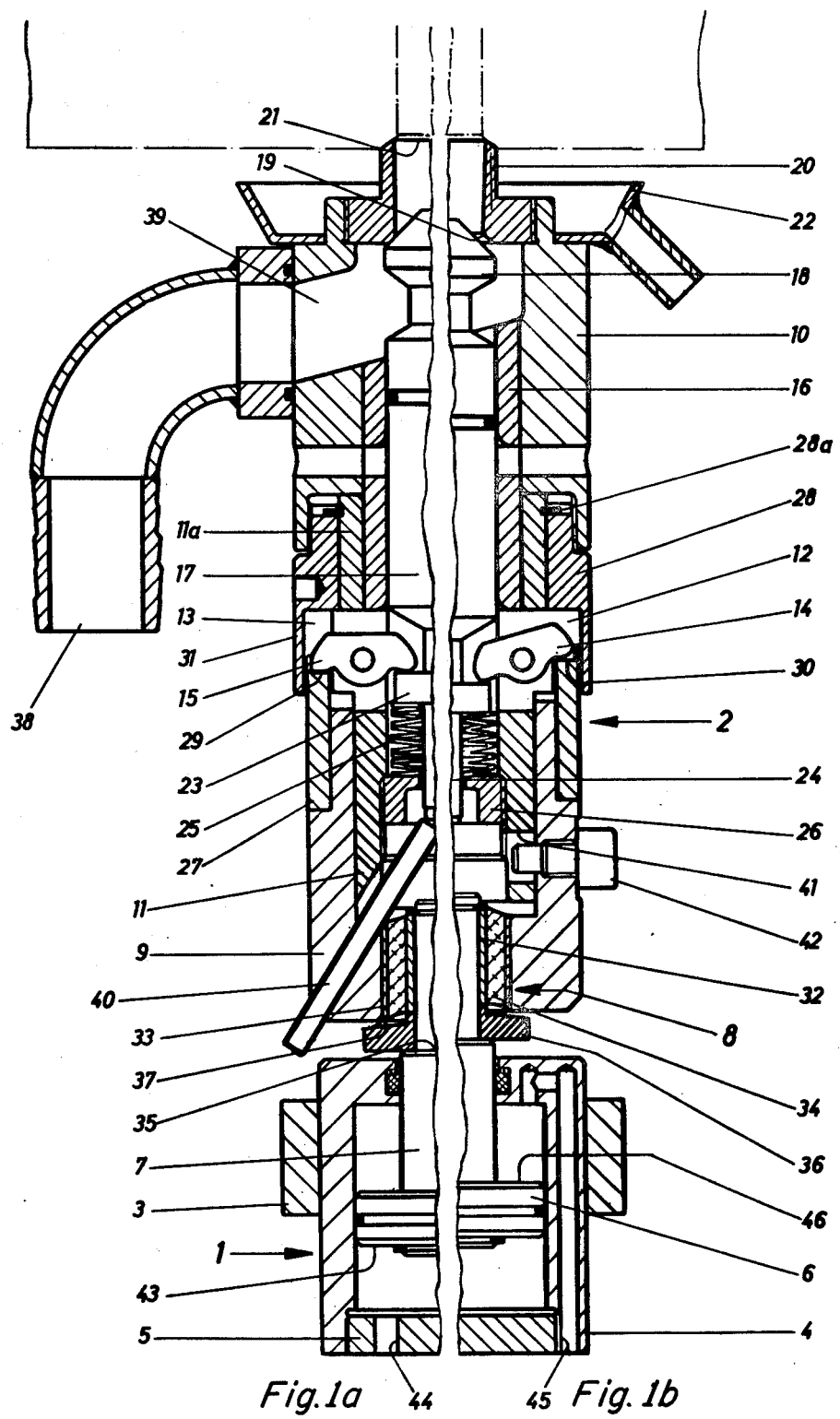
FIG. 1b is a partial longitudinal section of the same casting head, through the right-hand part thereof, the movable parts thereof being shown in their positions when the device is ready for casting.

As can be seen in FIGS. 1a and 1b, the exemplary embodiment of the casting head according to the invention comprises a part 1 that is stationary with respect to an extraneous synthetic-resin casting arrangement, and a part 2 that is movable with respect to the part 1. In order to keep the figures uncluttered, reference numerals have been used but once in the FIGS. 1a and 1b, without repeating them. The stationary part includes a casting-head carrier 3 and a hydraulic cylinder 4 having a cover 5. The cylinder comprises a double-acting piston 6 having a piston rod 7 guided through the cylinder wall and connected with the movable casting-head part 2 by way of a spring member 8.

The movable casting-head part 2 has a bottom housing part 9 and a top housing part 10. In the former, an insert bushing 11 is lengthwise movable within limits, having recesses 12, 13 which extend into the bottom housing part 9. Two toggle levers 14, 15 are located within these recesses, the shafts or pivots of the levers being journaled in the bushing 11.

The top housing part 10 of the casting head in turn lodges a removable guide bushing 16 which reaches into a widened part 11a of the bushing 11, and in which a closure rod 17 is disposed. The latter has, at the free end of the movable part 2, a conical closure head 18 for an opening passage 19 of a removable casting nozzle 20, the latter being inserted in the free end of the top housing part 10 and terminates in a casting or outlet opening 21.

A catching tray 22 is applied about the free end of the top part 10 for receiving and discharging any synthetic resin that may intentionally or unintentionally emerge from the nozzle 20. At the rear end, toward the bottom of FIG. 1b, still reaching into the bottom part 9, the closure rod 17 has a flange-like ring 23 which can be engaged by the toggle levers 14, 15. About an extension 24 of the rod 17, a spring package 25 is applied which is tensioned between the ring 23 and a clamp nut 26, the latter being threaded into the bushing 11 from below.

Between the bottom and top housing parts 9, 10, two cylinder rings 27, 28 are supported. The ring 27 has supporting cylinder curves 30 on front faces 29 of each cylinder half, serving for the adjustment of the toggle levers 14, 15, and this ring rests on the bottom part 9. The ring 28 in turn is a coupling nut which is threaded into the top part 10 and which bridges the recesses 12, 13 with a collar 31. By means of a check ring 28a, this ring 28 operates to secure the bushing 11 in the top part 10 by way of its widened part 11a.

The spring member 8, which rests on the piston rod 7, connects this rod with the housing bottom part 9. The member consists of two concentric steel sleeves 32, 33 having a caoutchouc or other resilient mass 34 provided therebetween. Between the inner sleeve 32 and a ledge 35 of the piston rod 7, a conical support washer or back-up ring 36 is inserted. The outer sleeve 3 rests in a bore of the housing part 9. When the spring member is loaded, a lower surface 37 of the outer sleeve 33 approaches the conical surface of the washer 36 and can rest thereon before the mass 3 is over-exerted.

The synthetic mass is fed under pressure to the movable part 2 of the casting head and to the nozzle 20 by way of a supply conduit 38 leading sideways to the top housing part 10, the conduit leading into a chamber 39 about the rear (bottom) of the closure head 18.

In order to alter the cross-section of the opening passage 19 about the closure head 18, an adjusting screw 40 reaches through the housing bottom part 9 to the closure rod 17 so as to limit its movement when the passage 19 is opened, or to increase the same.

The fact that the stationary part 1 and the housing part 10 are connected by way of the spring member 8 allows the part 2 to be adjusted with respect to the mold, independently of the part 1, noting that the casting nozzle 20 closely hugs or touches tan inlet opening of the mold.

The bottom and the top housing parts 9, 10 are held together only by the closure rod 17 and the insert bushing 11 which respectively reach into these housing parts. A bore 41 in the bushing 11 and a setting 42 applied to the bottom housing part 9 ensure that the bushing 11 is secured against rotation so that the toggle levers 14, 15 are not hindered in their movements.

The closure rod 17 is held within the insert bushing 11 by means of the spring package 25 and the clamp nut 26, and this rod 17 is held under pressure by the spring package 25 when the passage 19 is open so that the rod can be made to close the passage on effect of the spring package 25, when released by the toggle levers 14, 15. The rod 17 is consequently allowed the following movements:

When the passage 19 is closed, the rod 17 can be moved, together with the entire movable part 2, by means of the piston rod 7 from a rest position closer to the stationary part 1 to a farther, casting position, and back. Also, the rod 17 can be shifted with respect to the top housing part 10 by means of the ring 27, over its curves 30, and the levers 14, 15, in order to lift off the closure head 18 from the passage 19. The adjustment of the ring 27 can be performed manually, by rotation, or by lengthwise movement with the bottom housing part 9 with respect to the top part 10, by way of the piston 6, in a manner to be described later.

The displacement of the movable part 2 to the casting position is accomplished by admitting hydraulic pressure of a first intensity against the underside 43 of the piston 6 through an inlet opening 44 of the cylinder 4. When increasing the pressure to a second intensity, the bottom housing part 9 is slightly shifted additionally toward the top housing part 10 that touches the mold. As a consequence the curves 30 of the ring 27 exert a pressure against the toggle levers 14, 15 and thus against the flange-like ring 23. As a result, the spring package 25 is compressed and the closure head 18 is lifted away from the opening passage 19. In order to facilitate the additional shifting of the bottom housing part 9 with respect to the top part 10, when applying the higher pressure, the bore 41 in the bushing 11 is widened with a certain play so that the bushing can be freely moved lengthwise in the bottom housing part 9, as was described above.

When releasing the pressure that was applied to the underside 43 of the piston to a value that is equal with or below the first or lower pressure, the passage 19 of the casting head is closed as a result of the biasing effected by the spring package 25. In order to return the entire movable part 2 to its initial position nearer the stationary part 1, the pressure has to be removed from the underside 43 of the piston and applied instead to the piston top 46 by way of an inlet conduit 45.

Figure 2:
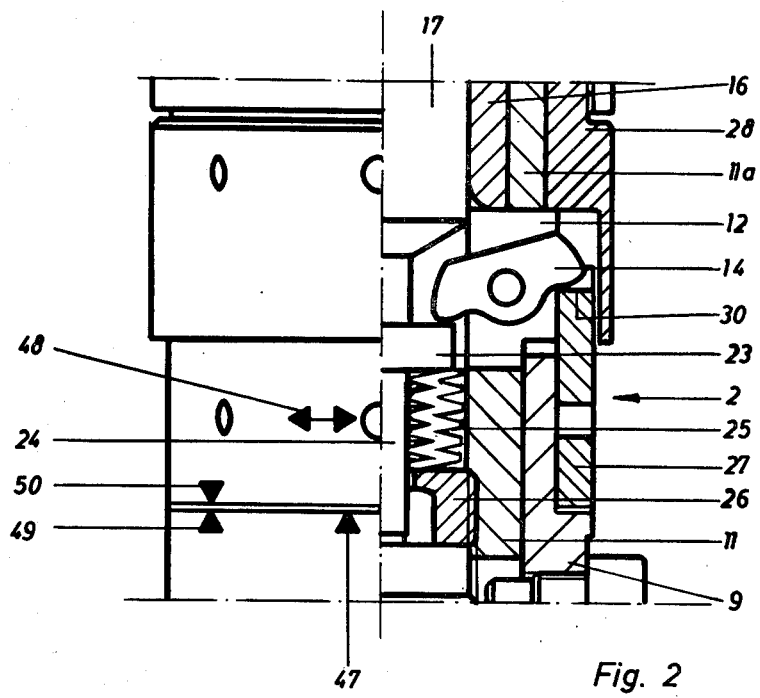
FIG. 2 is a longitudinal section of a portion of the head, sectioned in the right-hand part, on a larger scale, showing a cylinder ring for manual de-aeration of an inlet passage for the processed synthetic resin.

FIG. 2 shows on an enlarged scale the already described cylinder ring 27 with one of the curves 30 as provided for each of the cylinder halves, the curves touching with the front faces the toggle lever 14 or 15 (the parts not shown in the detail view of FIG. 2 were already shown in and described for FIG. 1. Only the parts 47 to 50 were not shown in the main or first illustration, and they will be described somewhat later).

As has been described, the raising of the pressure at the cylinder 4 to a second level of intensity adds an extra push to the housing part 9 in the casting position, and consequently to the ring 27 towards the mold-side end of the device. This opens the passage 19 for casting. By rotating the ring 27 by hand, the closure head 18 can be raised before casting as desired, for example to allow amounts of air or gas to escape that might still be contained in the casting resin within the supply conduit. The casting process can now be performed, and it is efficiently liberated from such inclusions. Without this expedient, the cylinder ring 27 could be made in one piece with the bottom housing part 9.

In FIG. 2 the ring 27 is shown in its extreme position for keeping the passage 19 open. A marking or index 50 on the ring 27 then faces another index 49, on the bottom housing part 9. In order to return the ring 27 to its normal position, it is rotated toward the right-hand side, as viewed in the illustration, along one end of an arrow 48, until it faces a third index or marking, 47, similarly applied to the part 9.

Figure 3:
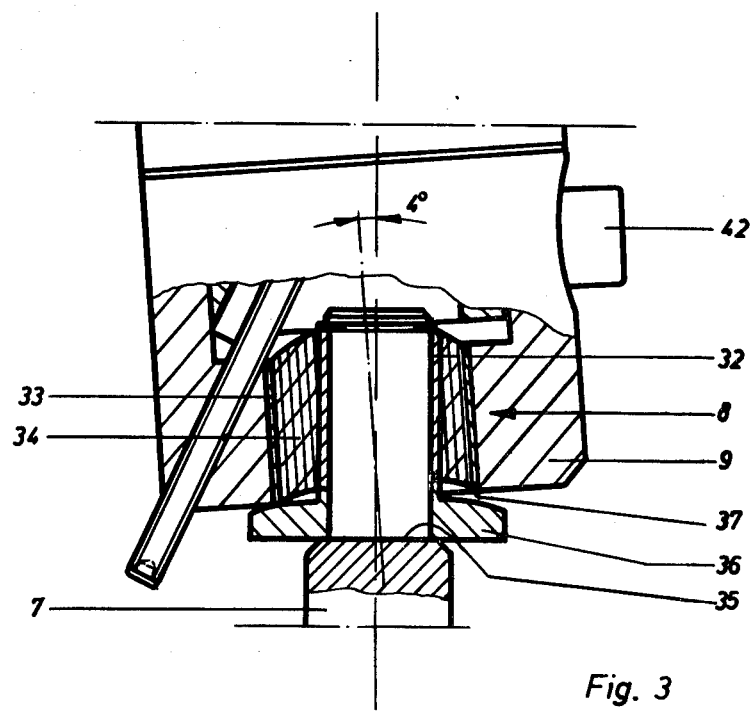
FIG. 3 is similarly a partial view, partly broken away and sectioned, on an enlarged scale, with a spring member which facilitates the alignment of the inventive head during casting.

FIG. 3 shows the described spring member 8 in an extreme position of its loading. Up to a certain angle, depending on its construction and as shown in this figure with about 4°, as a matter of example, the center line of the movable part 2 can be slightly tilted with respect to the stationary part 1, without detracting from the safe attainment of a safe contact between the exit opening for the synthetic resin and the earlier-mentioned inlet opening of the mold. Alignment of the movable casting-head part 2 with respect to the mold is thus considerably simplified and facilitated.

The inventive casting head, to be secured in the casting arrangement, has to be positioned opposite the mold with a sufficient distance so that there is enough play for manipulating the head, for example when removing the top housing part 10.

Casting is performed with the aid of the inventive casting head as follows: The movable part 2 is brought to the mold so that the casting nozzle 20 touches with its outlet opening 21 the inlet opening of the mold. This is performed, as was described, by applying the first-level or lower pressure to the underside 43 of the piston 6.

Now the synthetic-resin mass can be pressure-fed to the chamber 39 at the closure head 18 by way of the supply conduit 38. To allow air to escape that may be possibly trapped in the chamber, the head 18 can be moved away from the passage 19 for a short moment by manually moving the cylinder ring 27.

In order to release the synthetic mass from the head for casting in the mold, the pressure applied to the piston 6 by way of the inlet conduit 44 is raised to the second, higher level so that the levers 14, 15 compress the spring package 25 by way of the flange-like ring 23 in order to lift the closure head 18 off and away from the passage 19, just before casting.

Even after the mold has been completely filled with the resin, the piston 6 remains under the increased pressure of the inlet conduit 45, for the duration of the hardening of the synthetic-resin mass, and the supply conduit 38 is given a considerably increased pressure. This ensures that the necessary amount of compensating resin be safely introduced into the mold as might be required if the hardening mass shrinks.

Conclusion of the hardening process can be ascertained at the conventional air-escape slots of the mold when the entrained synthetic-resin particles are similarly hardened.

After the pressure has been released in the conduit 45 for the underside 43 of the piston, the head 18 closes under the effect of the biased spring package 25. Once the supply conduit 38 is also disconnected or shut off, pressure applied to the top 46 of the piston will bring the movable part 2 of the casting head back to its rest position.

It will be understood from the preceding description of the operation of the inventive casting head that the connection between the same and the extraneous mold can be established and released very easily, actually within seconds. Heat transfer during these time periods is minimal for the casting head.

However the contact between the head and the mold has to be maintained for the duration of the casting and the hardening. In order to keep the heat transfer low also during these times, it is recommended to use a material with a low heat conductivity for making the casting nozzle 20, such as for example filled Teflon (trade name), or a beryllium alloy. As another solution it is also possible, as indicated in the drawing, to make the part of the nozzle 20 that touches the mold with a small and/or reduced cross-section or end portion so as to reduce the heat transfer.

In other respects, the individual parts of the inventive casting head are preferably made from machine steel and the like material of different qualities, as required.

Instead of the two parallel toggle levers 14, 15, as described and shown, a single such lever can be provided without affecting the usefulness and operation of the casting head according to the invention.

It should be understood by those skilled in the art that various modifications, changes, additions, etc. can be made in the inventive casting head without departing from the spirit and scope of the invention.

What I claim is:

1. A casting head for cooperation with a mold in which hardenable synthetic resins can be cast under a high temperature, the mold having an inlet for the resins, the head comprising: a stationary part (1) and a part (2) movable with respect to said stationary part; at least one hydraulic cylinder (4, 5, 6) in said stationary part to change the relative position of a portion of said movable part with respect to said stationary part, between a closed rest position and a casting position, said cylinder having a double-acting piston rod (7) connected with said movable part; a housing in said movable part with bottom (9) and top (10) parts; said top housing part having therein an opening passage (19) for the resins, that leads toward the inlet of the mold, and an outlet opening (21) for the resins, which latter opening can be brought into close contact with the inlet of the mold; at least one toggle lever (14, 15) movably journaled within and pivotable in said bottom housing part; a lengthwise movable closure rod (17) in said movable part; a closure head (18) carried by the outer end of said closure rod, acting on said opening passage which is open in the casting position and leads to said outlet opening; and spring means (25) for biasing said closure rod and said closure head for closing said opening passage when the pressure applied to said cylinder has been released.

2. The casting head as defined in claim 1, further comprising means for regulating the amount of the synthetic resin being fed to the mold through said opening passage (19) by actuating an adjusting member (40) forming part of said regulating means.

3. The casting head as defined in claim 1, further comprising an adjusting ring (27) between said bottom housing part (9) and said at least one toggle lever (14, 15) for pivoting said at least one toggle lever, there being at least one supporting curve (30) on said adjusting ring, one for each said toggle lever, and means for manually moving said at least one toggle lever.

4. The casting head as defined in claim 1, further comprising an adjusting ring (27) disposed between said bottom housing part (9) and said at least one toggle lever (14, 15) for controlling the position of the latter.

5. The casting head as defined in claim 1, further comprising a removable guide bushing (16) in said top housing part (10) for receiving said closure rod (17) therein.

6. The casting head as defined in claim 1, further comprising a removable casting nozzle (20) between said opening passage (19) and the inlet opening of the mold, said nozzle having a heat conductivity that is lower than that of steel.

7. The casting head as defined in claim 1, further comprising a spring member (8) connecting said movable part (2) with said piston rod (7) of said stationary part (1), said spring member being disposed between said piston rod and said bottom housing part (9).

8. The casting head as defined in claim 7, further comprising a support washer (36) adjoining said spring member (8) on the side of said stationary part (1), the side of said washer that faces said spring member and said bottom housing part (9) having a conically outwardly tapering configuration.

9. The casting head as defined in claim 1, further comprising an insert (11, 11a) partly within said bottom housing part (9) for connecting the latter with said top housing part (10), said at least one toggle lever (14, 15) being journaled in and pivotable with respect to said insert.

* * * * *